United States Patent
Kuret et al.

(10) Patent No.: US 9,894,265 B1
(45) Date of Patent: Feb. 13, 2018

(54) ELECTRONIC DEVICE AND METHOD OF CONTROLLING SAME FOR CAPTURING DIGITAL IMAGES

(71) Applicant: BlackBerry Limited, Waterloo (CA)

(72) Inventors: Emily Kuret, Brantford (CA); Younghwan Kim, Waterloo (CA); Scott Paul Wenger, Waterloo (CA); Aidan Doan, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 15/390,066

(22) Filed: Dec. 23, 2016

(51) Int. Cl.
  *H04N 5/232* (2006.01)
  *H04N 5/225* (2006.01)
  *H04N 5/235* (2006.01)

(52) U.S. Cl.
  CPC ....... *H04N 5/23216* (2013.01); *H04N 5/2252* (2013.01); *H04N 5/2254* (2013.01); *H04N 5/2256* (2013.01); *H04N 5/2353* (2013.01); *H04N 5/23293* (2013.01)

(58) Field of Classification Search
  None
  See application file for complete search history.

(56) References Cited

U.S. PATENT DOCUMENTS

| | | | | |
|---|---|---|---|---|
| 8,504,125 B2 * | 8/2013 | Giustina | ............. | H04M 1/0235 455/575.1 |
| 2003/0040346 A1 * | 2/2003 | Fukuda | ................. | G06F 1/1616 455/575.1 |
| 2008/0242381 A1 * | 10/2008 | Hyun | .................. | H04M 1/0237 455/575.4 |
| 2010/0048243 A1 * | 2/2010 | Fourquin | ............ | H04M 1/0214 455/556.1 |
| 2010/0048264 A1 * | 2/2010 | Sato | .................... | H04M 1/0237 455/575.4 |

* cited by examiner

*Primary Examiner* — James Hannett
(74) *Attorney, Agent, or Firm* — Borden Ladner Gervais LLP; Geoffrey deKleine (57) ABSTRACT

A portable electronic device includes an input device, an input device housing, a display, and a display housing coupled to the input device housing. The display housing is moveable relative to the i housing by sliding between an extended position in which the input device is exposed and a contracted position in which the input device is covered by the display housing. The portable electronic device also includes a digital camera housed by the display housing. The input device housing includes an auxiliary camera lens fixed to a body such that the auxiliary camera lens is aligned with the digital camera for obtaining digital images utilizing the auxiliary camera lens when the display housing is in the contracted position, and the auxiliary camera lens is out of alignment with the digital camera for obtaining digital images without the auxiliary camera lens when the display housing is in the extended position.

16 Claims, 5 Drawing Sheets

ELECTRONIC DEVICE AND METHOD OF CONTROLLING SAME FOR CAPTURING DIGITAL IMAGES

FIELD OF TECHNOLOGY

The present disclosure relates to an electronic device including a digital camera and to control of the electronic device to capture digital photographs.

BACKGROUND

Electronic devices, including portable electronic devices, have gained widespread use and may provide a variety of functions including, for example, telephonic, electronic messaging and other personal information manager (PIM) applications.

Portable electronic devices such as PDAs, or tablet computers are generally intended for handheld use and ease of portability. Displays that are moveable relative to a keyboard, from a position in which the keyboard is hidden to a position in which the keyboard is exposed for use are particularly useful on portable electronic devices, which are small and may have limited space for user input and output.

Advances leading to decreased size of digital camera components have provided easier integration into such portable electronic devices. Portable electronic devices may also include a flash component or components for providing additional light during photography in low-light locations, such as indoors.

Further improvements in such portable electronic devices are desirable and are driven by consumer demand for increased or improved functionality.

BRIEF DESCRIPTION OF THE DRAWINGS

Embodiments of the present disclosure will now be described, by way of example only, with reference to the attached figures, in which.

DETAILED DESCRIPTION

The following generally describes a portable electronic device including an input device, an input device housing, a display for displaying information thereon, and a display housing coupled to the input device housing. The display housing is moveable by sliding along the input device housing, between an extended position in which the input device is exposed for use, and a contracted position in which the input device is covered by the display housing. A digital camera is housed by the display housing and framed by a first side of the display housing. The input device housing comprises a body and an auxiliary camera lens fixed to the body such that the auxiliary camera lens is aligned with the digital camera for obtaining first digital images utilizing the auxiliary camera lens when the display housing is in the contracted position relative to the input device housing, and the auxiliary camera lens is out of alignment with the digital camera for obtaining second digital images without the auxiliary camera lens when the display housing is in the extended position relative to the input device housing.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device such as a portable electronic device. Examples of portable electronic devices include mobile, or handheld, wireless communication devices such as cellular phones, cellular smart-phones, wireless organizers, personal digital assistants, wirelessly enabled notebook computers, tablet computers, cameras, mobile internet devices, and so forth.

Figure 1:
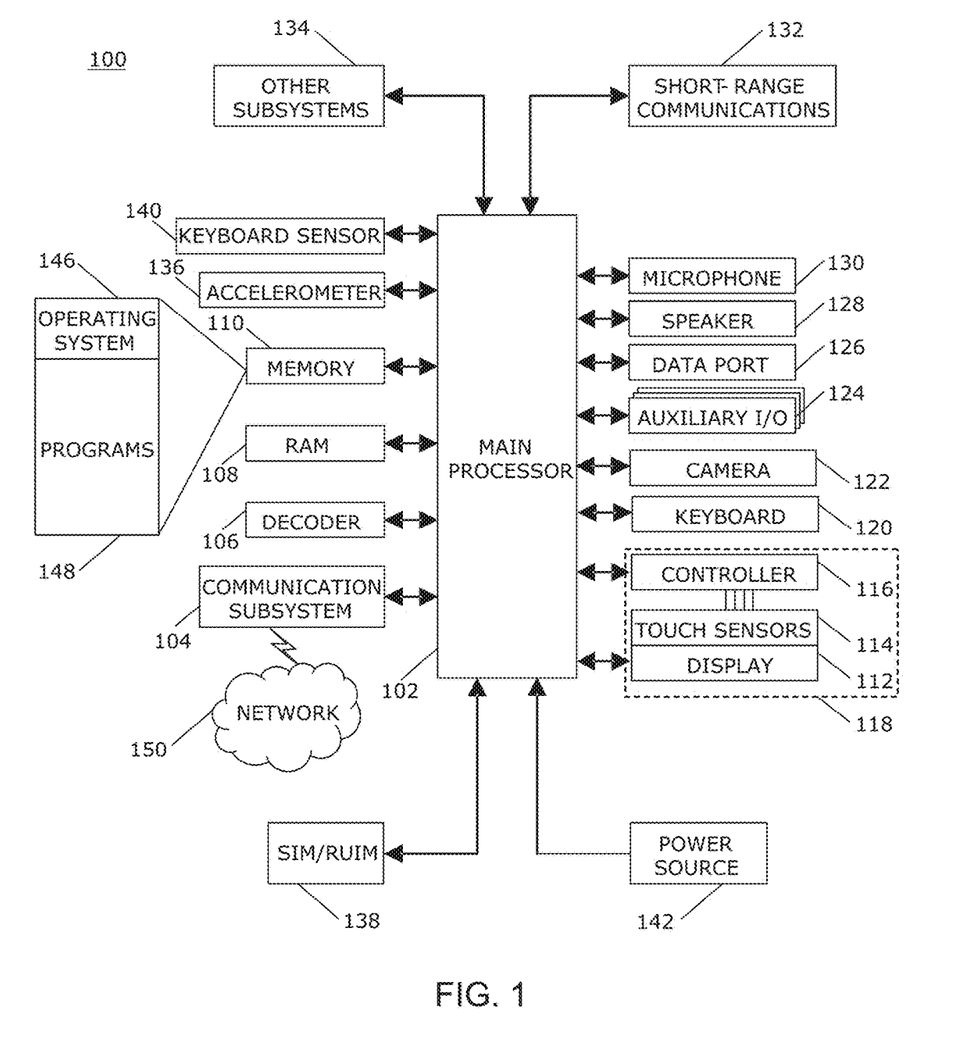
FIG. 1 is a block diagram of a portable electronic device in accordance with the present disclosure.

A block diagram of an example of an electronic device 100, which in the present example is a portable electronic device, is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a keyboard 120, a digital camera 122, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use.

The keyboard 120 may be, for example, a physical keyboard 120 that includes a plurality of mechanical keys that have mechanical switches or contacts for input to the electronic device 100 when a mechanical key of the keyboard is depressed by a sufficient force to oppose a bias of the mechanical key. Touch sensors may also be disposed on the physical keyboard 120 and the touch sensors coupled to a controller. Thus, in addition to depression of the mechanical keys of the physical keyboard 120 for input to the portable electronic device 100, touches on the mechanical keys may be detected for input to the processor 102.

The touch-sensitive display 118 is moveable relative to the physical keyboard 120. A keyboard sensor 140 is coupled to the processor 102 and is utilized to detect a location of a display housing of the touch-sensitive display 118 relative to a keyboard housing of the physical keyboard 120 of the electronic device 100. The keyboard 120 may be utilized for entry of characters such as alphabetical characters, numeric characters, punctuation, or symbols.

The touch-sensitive display 118 includes a display 112 and touch sensors 114 that are coupled to at least one controller 116 that is utilized to interact with the processor 102. Input via a graphical user interface is provided via the touch-sensitive display 118 and the keyboard 120. Information, such as text, characters, symbols, images, icons, and other items that may be displayed or rendered on a portable electronic device, is displayed on the touch-sensitive display 118 via the processor 102.

The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. Information is not displayed in the non-display area by the display. The non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112, in the non-display area. Optionally, a secondary display, not part of the primary display 112, may be disposed in the non-display area. Touch sensors including drive electrodes and sense electrodes may be disposed in the non-display area, which touch sensors may be extended from the touch sensors in the display area or may be distinct or separate touch sensors from the touch sensors in the display area. A touch, including a gesture, may be associated with, i.e., performed on, the display area, the non-display area, or both areas. The touch sensors including the drive electrodes and the sense electrodes may extend across substantially the entire non-display area or may be disposed in only part of the non-display area.

Figure 2:
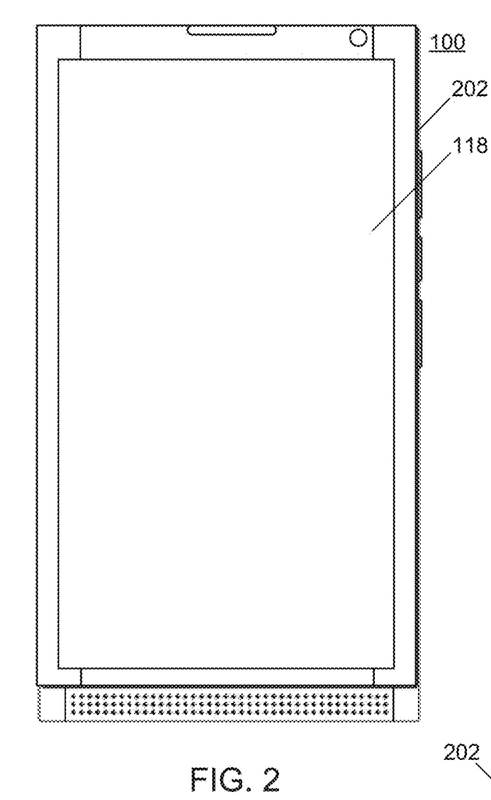
FIG. 2 is a front view of an example of a portable electronic device including a keyboard housing and a display housing that is movable relative to the keyboard housing, with the display housing in a contracted position, in accordance with the present disclosure.

A front view of an example of the electronic device 100 is shown in FIG. 2. The electronic device 100 includes two housing parts including a display housing 202 in which the touch-sensitive display 118 is disposed and an input device housing, which in the embodiment shown herein is a keyboard housing 204 (shown in FIG. 3). The display housing 202 is utilized to house or support components including at least some of the components shown in FIG. 1.

In the example described in detail herein, the input device housing is a keyboard housing that houses a keyboard. The present disclosure is not limited to a keyboard housing and a keyboard, however. Any other suitable input device may be housed by the housing 204. For example, a touch pad, a joystick, other physical buttons or any other suitable input device or devices may be housed by the housing 204.

Figure 3:
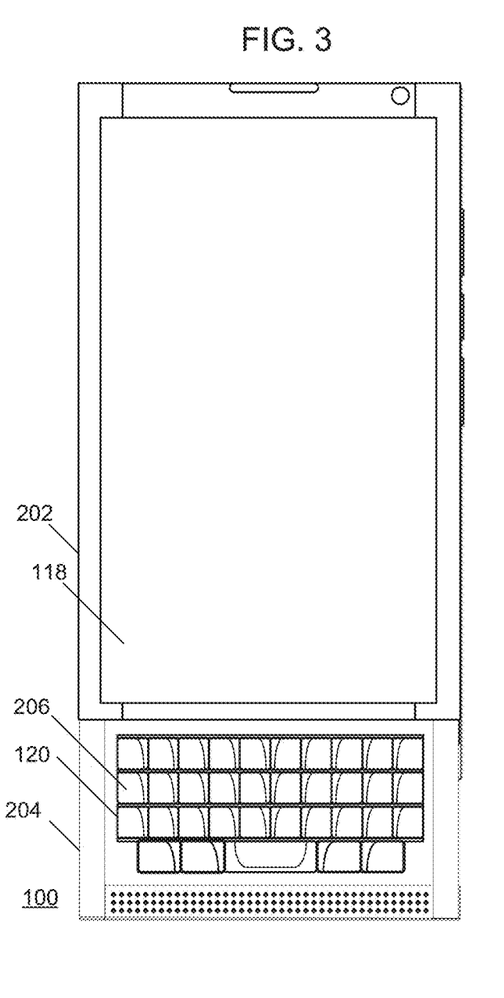
FIG. 3 is a front view of an example of the portable electronic device of FIG. 2 with the display housing in an extended position, in accordance with the present disclosure.

In this example, the physical keyboard 120 is disposed in the keyboard housing 204, which is shown in FIG. 3, below the touch-sensitive display 118 in the orientation illustrated in FIG. 3. The physical keyboard 120 includes a plurality of mechanical keys 206. Each one of the mechanical keys 206 of the keyboard is associated with characters or a function such that the characters are entered utilizing the mechanical keys 206. The keyboard housing 204 may also be utilized to house or support components including at least some of the components shown in FIG. 1.

The display housing 202 is moveable relative to the keyboard housing 204 into two different positions, including a contracted position, as shown in FIG. 2 and an extended position, as shown in FIG. 3. The display housing 202 is moveable relative to the keyboard housing 204 by sliding the display housing 202 between the contracted position in which the keyboard housing 204 is stacked with the display housing 202 such that the physical keyboard 120 is disposed between the display housing 202 and a back of the keyboard housing 204, as shown in FIG. 2, and the extended position in which the keyboard housing 204 extends from the display housing 202 to expose the physical keyboard 120 below the touch-sensitive display 118 in the orientation in which the portable electronic device 100 is illustrated in FIG. 3.

Thus, the touch-sensitive display 118 is moveable relative to the physical keyboard 120, between the first position, shown in FIG. 2, in which the physical keyboard is not exposed and the second position, shown in FIG. 3, in which the physical keyboard 120 is exposed for use. The physical keyboard 120 is therefore selectively exposable for use. The keyboard sensor 140, referred to above with reference to FIG. 1, is arranged and constructed to detect a position of the display housing 202 relative to the keyboard housing 204. The keyboard sensor 140, which may be any suitable sensor such as a Hall effect sensor, is coupled to the processor 102 to detect that the touch-sensitive display 118 is in the contracted position, the extended position, or in a location between the contracted and extended positions.

The physical keyboard 120 may be a QWERTY keyboard. Alternatively, other keyboard layouts may be successfully implemented, such as an AZERTY keyboard, a QWERTZ keyboard, or any other suitable keyboard.

Information may be displayed on the touch-sensitive display 118. The information displayed may include any suitable information such as icons, text, pictures, video, documents, a webpage, or any other suitable information. The information may be associated with, for example, a home page, a menu or submenu, an application or applications, and so forth. The information may be selectable, for example, by a touch on the touch-sensitive display 118, or by a touch, such as a hover gesture, a tap, a double tap, or other suitable touch, on the physical keyboard 120.

A virtual keyboard may also be displayed. The keys of the virtual keyboard may be selectable by a touch on an area of the touch-sensitive display 118 associated with the respective key. Display of the virtual keyboard may be discontinued in response to movement of the display housing 202 relative to the keyboard housing 204 to the extended position, as shown in FIG. 3, to thereby expose the physical keyboard 120.

Figures 4, 5:
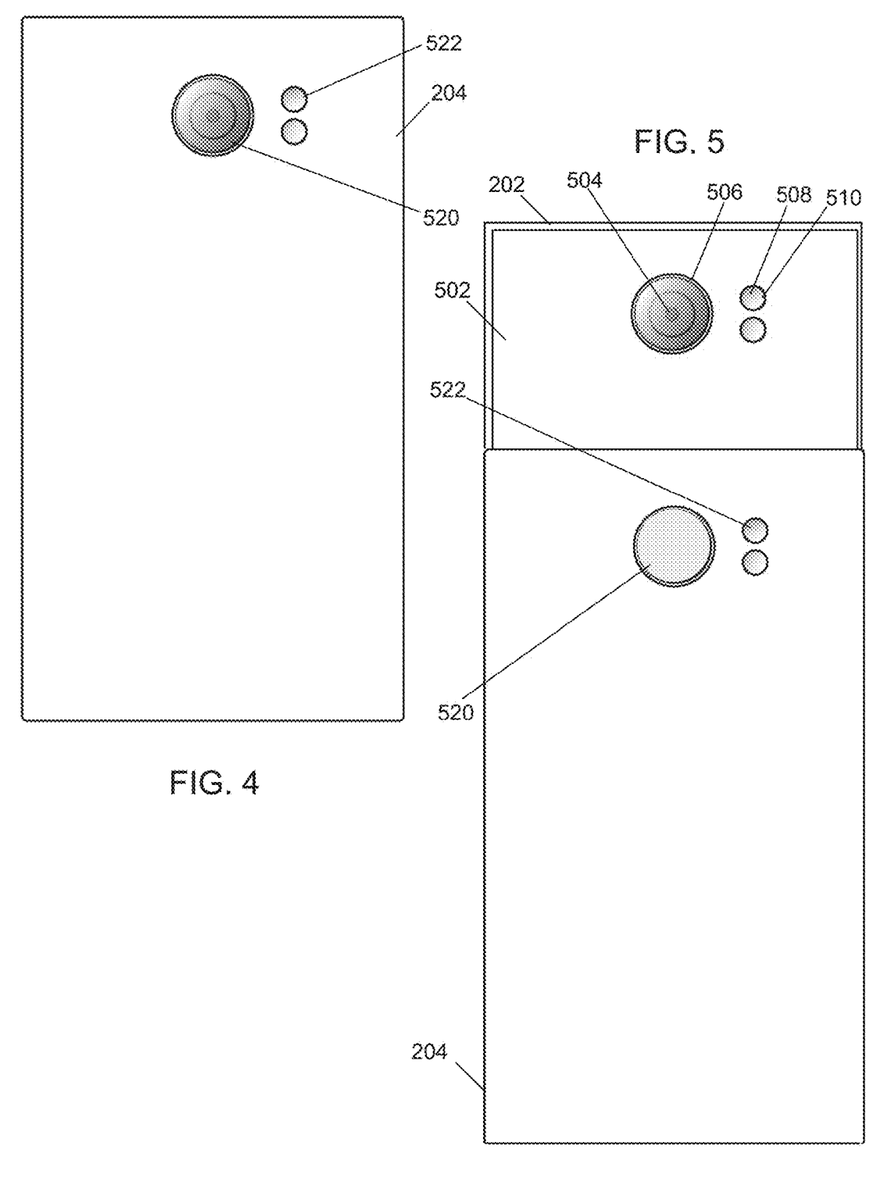
FIG. 4 is a rear view of the portable electronic device of FIG. 2 with the display housing in the contracted position.
FIG. 5 is a rear view of the portable electronic device of FIG. 2 with the display housing in the extended position.

Referring to FIG. 4 and FIG. 5, rear views of the portable electronic device of FIG. 2 are shown with the display housing 202 in the contracted position, as shown in FIG. 4, and in the extended position, as shown in FIG. 5.

As indicated, the display housing 202 is utilized to house or support some of the components shown in FIG. 1. The display housing 202 houses the digital camera 122 and the rear side 502 of the display housing 202 includes an aperture therein to frame an image capturing system 504 of the digital camera 122 to facilitate the capture of digital images utilizing the digital camera 122. Thus, the touch-sensitive display 118 is disposed on an opposite side of the display housing 202 as the side that frames the image capturing system 504 of the digital camera 122. A camera cover 506 such as a lens or an optically clear cover of suitable material such as glass, may be disposed in the aperture to inhibit the ingress of dirt or dust into the display housing 202 or onto the image capturing system 504 of the digital camera 122. Optionally, an exterior surface of the camera cover 506 may be flush with the outer surface of the rear side 502 of the display housing 202 to facilitate sliding of the display housing 202 relative to the keyboard housing 204 from the extended position to the contracted position. The digital camera 122 includes several components such as optical lenses, an image sensor, and other components, referred to below with reference to FIG. 6.

The display housing 202 also includes an aperture or apertures for a flash output arrangement 508 of the digital camera 122. The flash output arrangement 508 is utilized to provide light, in addition to ambient light, when a digital image is captured. A flash cover 510, such as an optically clear cover of suitable material such as glass, may be disposed in the aperture to inhibit the ingress of dirt or dust into the display housing 202 or onto the flash output arrangement 508 of the digital camera 122. Optionally, an exterior surface of the flash cover 510 may be flush with the outer surface of the rear side 502 of the display housing 202.

The keyboard housing 204 extends and covers the entire rear side 502 of the display housing 202 when the display housing 202 is in the contracted position shown in FIG. 4. The keyboard housing 204 includes an auxiliary lens 520 disposed in the rear side of the keyboard housing 204 and fixed at a location in the rear side of the keyboard housing 204 such that the auxiliary lens 520 is aligned with the digital camera 122 and the camera cover 506 when the display housing 502 is in the contracted position shown in FIG. 4. Thus, the auxiliary lens 520 is located to facilitate use of the auxiliary lens 520, in addition to the lenses of the digital camera 122, when the display housing 502 is in the contracted position.

The auxiliary lens 520 may be any suitable lens to provide further digital camera functionality. For example, the auxiliary lens 506 may be a wideangle lens to capture greater width of scene, a fisheye lens, a zoom lens to increase the zoom or change the focal length by comparison the use of the digital camera without the lens, a macro lens, or any other suitable lens to provide additional functionality to the digital camera 122.

In addition to the auxiliary lens 520, the keyboard housing 204 includes an optically clear cap 522 or caps fixed to a body of the keyboard housing 204 to facilitate the transmittance of light therethrough when the display housing 202 is in the contracted position relative to the keyboard housing 204 and the keyboard housing 204 covers the rear side 502 of the display housing 202, including the flash output arrangement 508. Thus, the optically clear cap 522 is aligned with the flash cover 510 when the display housing 202 is in the contracted position.

When the display housing 202 is in the extended position relative to the keyboard housing 204, a portion of the rear side 502 of the display housing 202 is exposed, including the camera cover 506 protecting the image capturing system 504 of the digital camera 122 and the flash cover 510 protecting the flash output arrangement 508. Thus, the auxiliary lens 520 is out of alignment, and spaced from the digital camera 122 to facilitate the capture of images without the use of the auxiliary lens 520. In addition, the optically clear cap 522 is spaced from and out of alignment with the flash cover 510 and flash output arrangement 508 when the display housing 202 is in the extended position relative to the keyboard housing 204.

The digital camera 122 is therefore usable to capture digital images utilizing the auxiliary lens 520 when the display housing 202 is in the contracted position relative to the keyboard housing 204 and is usable to capture digital images without utilizing the auxiliary lens 520, or absent the auxiliary lens 520, when the display housing 202 is in the extended position relative to the keyboard housing 204. Thus, the auxiliary lens 520 is selectively usable with the digital camera based on the position of the display housing 202 relative to the keyboard housing 204.

In the example in which the auxiliary lens 520 is a wide angle lens, a digital image may be captured utilizing the digital camera 122 when the display housing 202 is in the extended position relative to the keyboard housing 204. To capture a digital image with wider angle, the display housing 202 is moved by sliding the display housing 202 relative to the keyboard housing 204, to the contracted position. The digital image is then captured utilizing the wide angle lens.

The display housing 202 and the keyboard housing 204 are configured to provide a generally sealed enclosure between the rear side 502 of the display housing 202 and the keyboard housing to inhibit the ingress of dust between the display housing 202 and the keyboard housing 204. For example, the keyboard housing 204 may include a sealing element or ring that extends around at least a portion of the keyboard housing 204 that includes the auxiliary lens 520 and the optically clear cap 522. The sealing element is slideable along the rear side 502 of the display housing 202 as the display housing 202 is moved relative to the keyboard housing 204.

Figure 6:
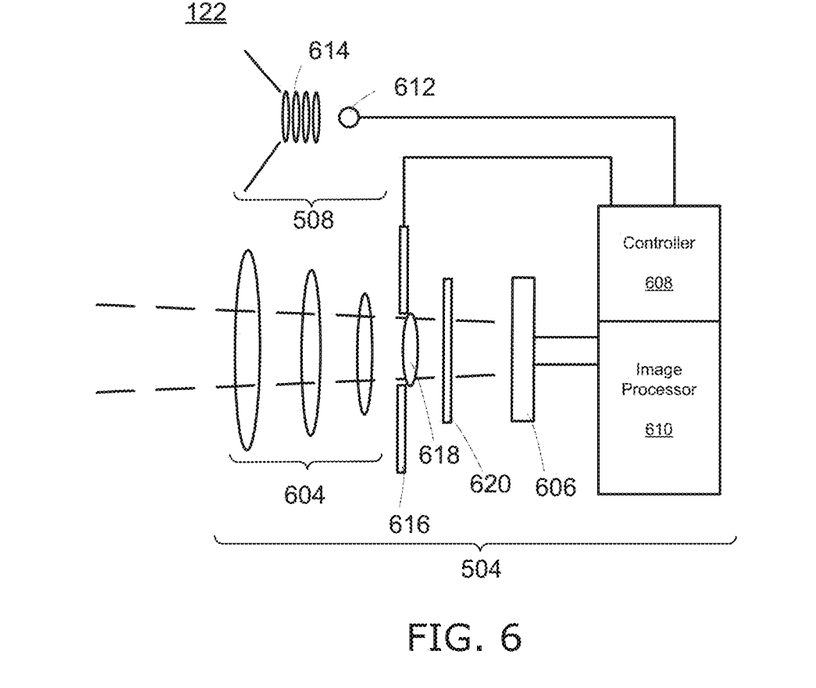
FIG. 6 is a functional diagram of a camera in accordance with the disclosure.

A schematic view of the digital camera 122 is shown in FIG. 6. The digital camera 122 includes the flash output arrangement 508 and the image capturing system 504 both framed by the display housing 202. In the present example, the flash output arrangement 508 includes a white LED light source 612 and a lens array 614 aligned in an axis for providing a preflash output and a main flash output from the LED light source 612.

The image capturing system 504 includes components such as an optical system of lenses 604 through which light passes, an image sensor 606, a controller 608 and an image processor 610. The outermost one of the lenses 604 is covered by the camera cover 506 for protecting the lenses 604. The light passes from the lenses 604 through a shutter 616, through a suitable fixed diaphragm 618, through a band-pass filter 620 for filtering out, for example, high and low frequency light while allowing visible light to pass through, and to the image sensor 606. In the present example, the digital camera 122 includes the shutter 616. Alternatively, the digital camera 122 may be constructed without a shutter 616. A shutter may be utilized to control the time during which light is received at the image sensor 606 when capturing a digital image. Rather than a shutter, the time during which light is received at the image sensor 606 may be controlled electronically based on time of exposure of the lines of the image sensor 606 to light before reading out.

An image processor 610 is coupled to the image sensor 606 for capturing an image and the controller 608 controls the flash output arrangement 508 to provide the flash output. In the present embodiment, the controller 608 is a functional unit that is part of the image processor 610. Alternatively, the controller 608 may be a separate unit coupled to the image processor 610. Other features or functional units such as timer and driver components are also provided. Such features and functional units and are not shown in FIG. 6 for the purpose of clarity of illustration and description.

The lenses 604, the shutter 616, and the diaphragm 618 together receive light when the digital camera 122 is in use and direct light through the filter 620 toward the image sensor 606. The shutter 616 may be utilized to control the amount of light that is allowed to passes through the lenses 604 to the image sensor 606. The image processor 610 determines, based on the received light, the autofocus location or distance, automatic exposure, and automatic white-balance values, which are the settings that are controlled for capturing the digital image.

The image sensor 606 includes, for example, a charge coupled device (CCD) sensor surface for receiving the light that passes through the lenses 604, shutter 616, fixed diaphragm 618, and filter 620. The light received at the image sensor 606 is converted to electrical signals by photoelectric conversion of light received at each pixel of the sensor surface of the image sensor 606 to a signal. The signals from all of the pixels together form an image signal that is used in creating the digital image that is displayed on the display 112 of the portable electronic device 100.

Software for controlling the digital camera 122 is stored on the portable electronic device 100, for example, in the programs in the memory 110. The touch-sensitive display 118 may be utilized for input and output for the digital camera 122. Thus, the digital camera 122 may be controlled utilizing a user interface provided by the touch-sensitive display. By pressing, for example, a key on the keyboard 120, by selecting an on-screen menu option or icon, or by depressing a button on the portable electronic device 100, the camera 122 is turned on as the camera application is launched. The camera 122 is employed for capturing, also referred to as obtaining or taking, digital images by, for example, input from a touch detected by the touch-sensitive display 118. The camera 122 may also be utilized for capturing video images. The touch-sensitive display 118 is utilized as a viewfinder, displaying the view of the camera prior to capturing an image when the display housing 202 is in the contracted position and in the extended position relative to the keyboard housing 204. A digital image, also referred to as a digital photograph, that is captured is displayable on the touch-sensitive display 118 and the digital image may be saved as a digital photograph file in a digital photograph database resident on the portable electronic device 100, for example, in the memory 110.

Utilizing the touch-sensitive display 118 as the user interface, the associated camera application facilitates user interaction with the camera 122, including, for example, zooming in and out, changing the resolution of the captured image, turning the flash output arrangement on, off, or to an automatic setting, initiation of capture of the digital image, and so forth. Because the touch-sensitive display 118 is exposed and is utilized as the user interface when the display housing 202 is in the contracted position and in the extended position relative to the keyboard housing 204, the same user interface is utilized regardless of the position of the display housing 202. Thus, the user interface is consistent.

Digital images captured utilizing the camera 122 may be stored in any suitable format in the memory 110, for example, and may be retrieved, for example, for viewing, for setting as a background on the touch-sensitive display 118, or for sending as an attachment in a message.

Figure 7:
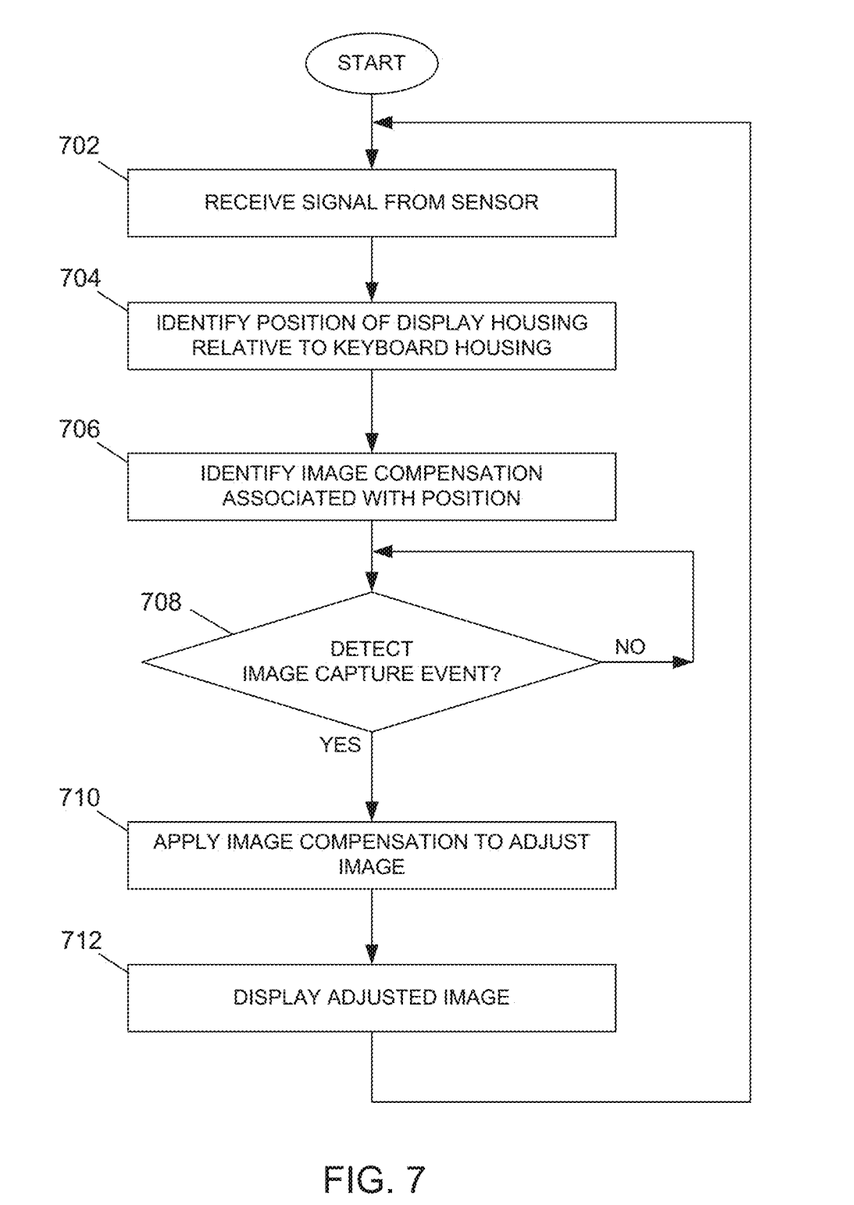
FIG. 7 is flowchart illustrating a method of controlling a portable electronic device including the camera of FIG. 6.

A flowchart illustrating a method of controlling the camera 122 is shown in FIG. 7. The method may be carried out by software executed, for example, by the processor 102 and the image processor 410. Coding of software for carrying out such a method is within the scope of a person of ordinary skill in the art given the present description. The method may contain additional or fewer processes than shown and/or described, and may be performed in a different order. Computer-readable code executable by a processor 102 and the image processor 410 of the portable electronic device 100 to perform the method may be stored in a computer-readable storage medium, such as a non-transitory computer-readable medium.

The method may be carried out in response to an input to launch the camera application, such as receipt of an input from depression of a key on the keyboard 120, selection of an on-screen menu option or icon, or depression of a button on the portable electronic device 100. The method may be discontinued, for example, when the camera application is closed or another application is launched.

An input from the keyboard sensor 140 is received at 702. The input from the keyboard sensor 140 is utilized to identify the position of the display housing 202 relative to the keyboard housing 204 at 704. Thus, the input from the keyboard sensor 140 is utilized to detect that the display housing 202 is in the contracted position or the extended position, or in a location between the contracted and extended positions.

Based on the signal from the sensor, and thus, the position of the display housing 202 relative to the keyboard housing 204, an image compensation is identified for adjusting a captured image utilizing the digital camera. The image compensation may include an exposure compensation for adjusting the exposure of a captured image, an anti-distortion optical compensation, an optical effects compensation, such as a zoom or fisheye effect compensation, and any combination of such compensations. The image compensation is therefore dependent on the position of the display housing 202 relative to the keyboard housing 204 and therefore dependent on the position of the auxiliary lens 520 relative to the digital camera 122. The image compensation may be a setting or settings stored in memory 110. For example, the image compensation may be an exposure compensation by amplification of the voltage received at each pixel position.

In response to receipt of an input, for example, from the touch-sensitive display 118, to capture an image at 708, the process continues at 710 and the image compensation, which is a setting, is applied to adjust the exposure of the captured image at 710. The captured image, as adjusted based on the image compensation, is then displayed on the touch-sensitive display 118.

In one example, the auxiliary lens 520 is a zoom lens. A signal from the keyboard sensor 140 is received at 702, indicating that the display housing 202 is in the contracted position relative to the keyboard housing 204. An exposure compensation is identified at 706. In response to receipt of an input on the touch-sensitive display 118 to capture a digital image at 708, the exposure compensation is applied at 710 to increase the exposure relative to the exposure when a digital image is captured without utilizing the auxiliary lens 520. The adjusted image is displayed at 712. The display housing 202 is moved to the expanded position relative to the keyboard housing 204 and a signal from the keyboard sensor 140 is received at 702, indicating that the display housing 202 is in the expanded position. Thus, the auxiliary lens 520, which is a zoom lens in this example, is not aligned with the digital camera 122. An exposure compensation is identified at 706. In response to receipt of an input on the touch-sensitive display 118 to capture a digital image at 708, the exposure compensation is applied at 710 to decrease the exposure relative to the exposure when a digital image is captured utilizing the auxiliary lens 520. The adjusted image is displayed at 712. The adjusted image may optionally be stored in memory, such as the memory 110.

In the example described above, a keyboard 120 is included in a keyboard housing 204. Any other suitable input device may be housed by the housing 204. For example, a touch pad, a joystick, other physical buttons or any other suitable input device or devices may be housed by the housing 204.

Advantageously, the auxiliary lens is selectively utilized by sliding the display housing relative to the input device housing to move the auxiliary lens into and out of alignment with the image capturing system of the digital camera. The selective use of the auxiliary lens provides further functionality for the digital camera, facilitating use of only the camera lens or camera lenses, such as those shown in FIG. 6, when the auxiliary lens is not in alignment with the image capturing system, and the additional use of the auxiliary lens when the auxiliary lens is in alignment with the image capturing system. A seal enclosure between the rear side of the display housing and the input device housing inhibits the ingress of dust or dirt on the inside surface of the auxiliary lens. The touch-sensitive display provides a user interface for use and control of the digital camera and the same touch-sensitive display provides a consistent user interface regardless of the position of the display housing relative to the input device housing.

The scope of the claims should not be limited by the preferred embodiments set forth in the examples, but should be given the broadest interpretation consistent with the description as a whole.

What is claimed is:

1. A portable electronic device comprising:
   an input device;
   an input device housing;
   a display for displaying information thereon;
   a display housing coupled to the keyboard housing, the display housing moveable by sliding along the input device housing, between an extended position in which the input device is exposed for use, and a contracted position in which the input device is covered by the display housing;
   a digital camera housed by the display housing and framed by a first side of the display housing;
   wherein the input device housing comprises a body and an auxiliary camera lens fixed to the body such that the auxiliary camera lens is aligned with the digital camera for obtaining first digital images utilizing the auxiliary camera lens when the display housing is in the contracted position relative to the input device housing, and the auxiliary camera lens is out of alignment with the digital camera for obtaining second digital images without the auxiliary camera lens when the display housing is in the extended position relative to the input device housing.

2. The portable electronic device according to claim 1, wherein the display is disposed on a second side of the display housing, opposite the first side that frames the digital camera.

3. The portable electronic device according to claim 1, wherein the input device housing and the display housing are configured to provide a seal between the first side of the display housing and the input device housing to inhibit ingress of dust therebetween.

4. The portable electronic device according to claim 1, wherein the display comprises a touch-sensitive display utilized to provide an interface for control of the camera.

5. The portable electronic device according to claim 1, wherein the interface provided by the touch-sensitive display is utilized to control the camera when the display housing is in the extended position and in the contracted position relative to the input device housing.

6. The portable electronic device according to claim 1, comprising a sensor cooperating with the display housing and the input device housing for detecting the position of the display housing relative to the input device housing.

7. The portable electronic device according to claim 6, wherein the processor is configured to provide image compensation that is dependent on the position of the display housing relative to the input device housing.

8. The portable electronic device according to claim 1, wherein the display is configured to provide a viewfinder when the display housing is in the extended position and in the contracted position relative to the input device housing.

9. The portable electronic device according to claim 1, comprising a flash arrangement housed framed by the first side of the display housing.

10. The portable electronic device according to claim 9, wherein the input device housing includes an optically clear cap therein, the optically clear cap located in alignment with the flash arrangement when the display housing is in the contracted position relative to the input device housing and spaced from the flash arrangement when the display housing is in the extended position relative to the input device housing.

11. A method of controlling a portable electronic device including an input device housing and a display housing moveable by sliding along the input device housing, between an extended position in which an input device is exposed for use, and a contracted position in which the input device is covered by the display housing, and digital camera housed by the display housing and framed by a first side of the display housing, wherein the input device housing includes an auxiliary camera lens that is aligned with the digital camera for obtaining first digital images utilizing the auxiliary camera lens when the display housing is in the contracted position relative to the input device housing, and out of alignment with the digital camera for obtaining second digital images without the auxiliary camera lens when the display housing is in the extended position relative to the input device housing, the method comprising:

receiving a signal from a sensor, identifying which of the extended position and the contracted position, the display housing is in relative to the input device housing;

based on the signal from the sensor, identifying an image compensation for adjusting a captured image utilizing the digital camera;

applying the image compensation to provide an adjusted captured image.

12. The method according to claim 11, wherein the image compensation comprises exposure compensation.

13. The method according to claim 11, comprising displaying a resulting compensated image on a display housed by the display housing.

14. The method according to claim 11, wherein the touch-sensitive display is utilized to provide an interface for controlling the camera when the display housing is in the extended position and in the contracted position relative to the input device housing.

15. The method according to claim 11, wherein the touch-sensitive display is configured as a viewfinder when the display housing is in the extended position and in the contracted position relative to the input device housing.

16. A non-transitory computer-readable medium having computer-readable code stored thereon, the computer-readable code executable by at least one processor of a portable electronic device to perform the method according to claim 11.

* * * * *